(12) United States Patent
Freeny, Jr.

(10) Patent No.: US 8,958,540 B2
(45) Date of Patent: *Feb. 17, 2015

(54) REMOTE PBX SYSTEM AND ADVANCE COMMUNICATION TERMINALS

(71) Applicant: Automated Business Companies, Spring, TX (US)

(72) Inventor: Charles C. Freeny, Jr., Flower Mound, TX (US)

(73) Assignee: Automated Business Companies, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/735,808

(22) Filed: Jan. 7, 2013

(65) Prior Publication Data
US 2014/0194087 A1   Jul. 10, 2014

Related U.S. Application Data

(63) Continuation of application No. 11/787,070, filed on Apr. 13, 2007, now Pat. No. 8,351,592, which is a continuation of application No. 10/341,901, filed on Jan. 13, 2003, now Pat. No. 7,206,401.

(60) Provisional application No. 60/350,444, filed on Jan. 11, 2002.

(51) Int. Cl.
*H04M 7/00* (2006.01)
*H04W 84/16* (2009.01)

(52) U.S. Cl.
CPC .................................. *H04W 84/16* (2013.01)

USPC ........................................................ 379/225

(58) Field of Classification Search
CPC .... H04M 3/42314; H04M 7/009; H04M 9/00
USPC ............................................. 379/225, 220.01
See application file for complete search history.

(56) References Cited

U.S. PATENT DOCUMENTS

| 5,463,684 | A  | * | 10/1995 | Morduch et al. | 379/202.01 |
| 6,243,743 | B1 | * | 6/2001  | Freeny         | 709/217    |
| 6,477,242 | B1 | * | 11/2002 | Freeny, Jr.    | 379/93.24  |

* cited by examiner

*Primary Examiner* — Creighton Smith
(74) *Attorney, Agent, or Firm* — Dunlap Codding, P.C.

(57) ABSTRACT

A method for providing a remote PBX service by a customer's phone service provider. More than one telephone number is assigned to one customer's telephone communication link in communication with at least one telephone. A connect signal is received by the customer's phone service provider including one of the telephone numbers assigned to the customer's telephone communication link. A called telephone code is generated indicative of the number included in the connect signal. The called telephone code is sent to the customer's telephone communication link whereby a user of the customer's telephone communication link is capable of knowing which of the more than one telephone numbers assigned to the customer's telephone communication link was called prior to answering the telephone connected to the customer's telephone communication link. Thus, the customer's phone service provider provides the remote PBX service for the customer without the necessity of a local PBX.

12 Claims, 4 Drawing Sheets

Communication Service Providers (CSP) And Remote PBX System (RPS) Elements

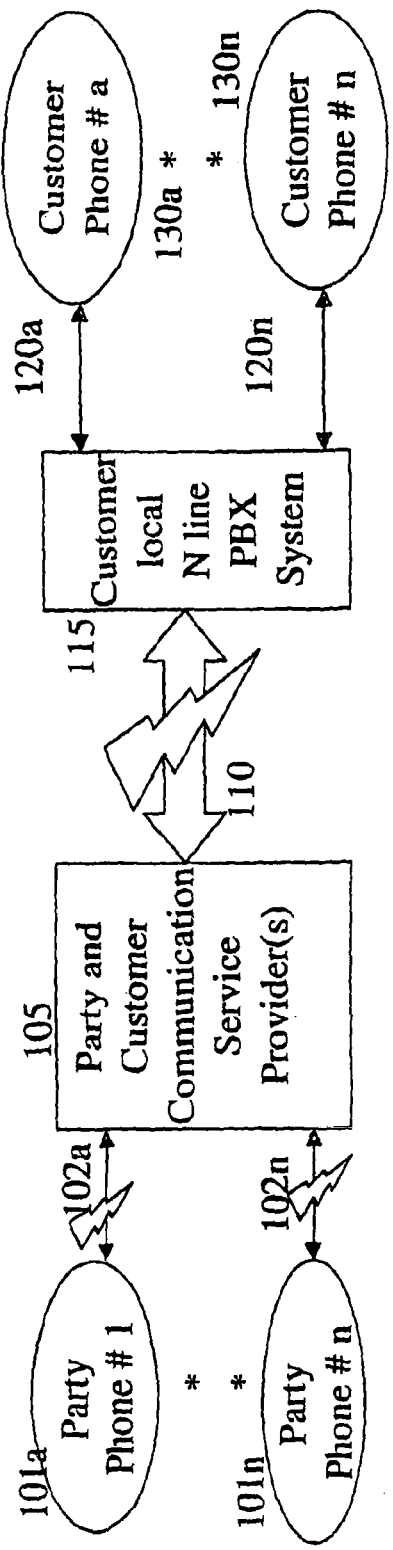
Figure 1 Prior Art Local PBX System Elements
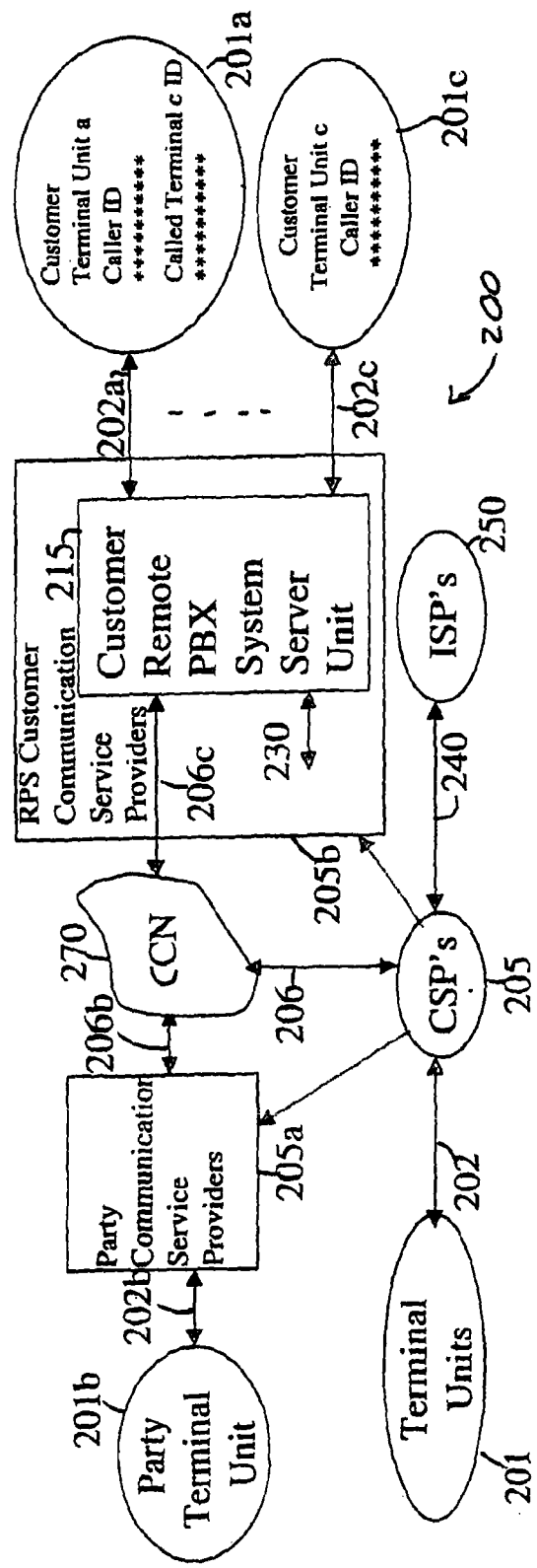
Figure 2 Communication Service Providers (CSP) And Remote PBX System (RPS) Elements

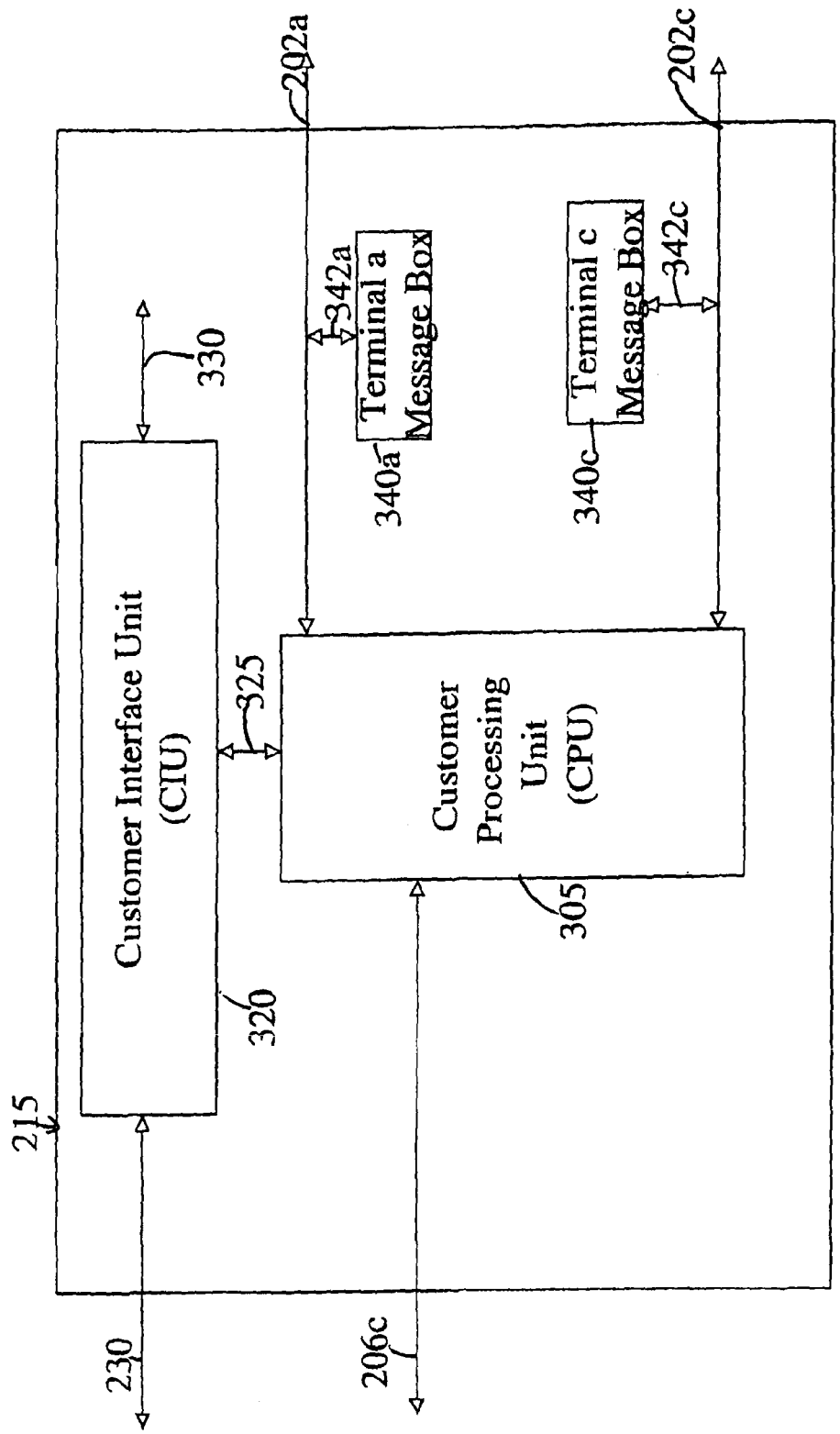
Figure 3 Remote PBX Server Unit Individual Customer Elements

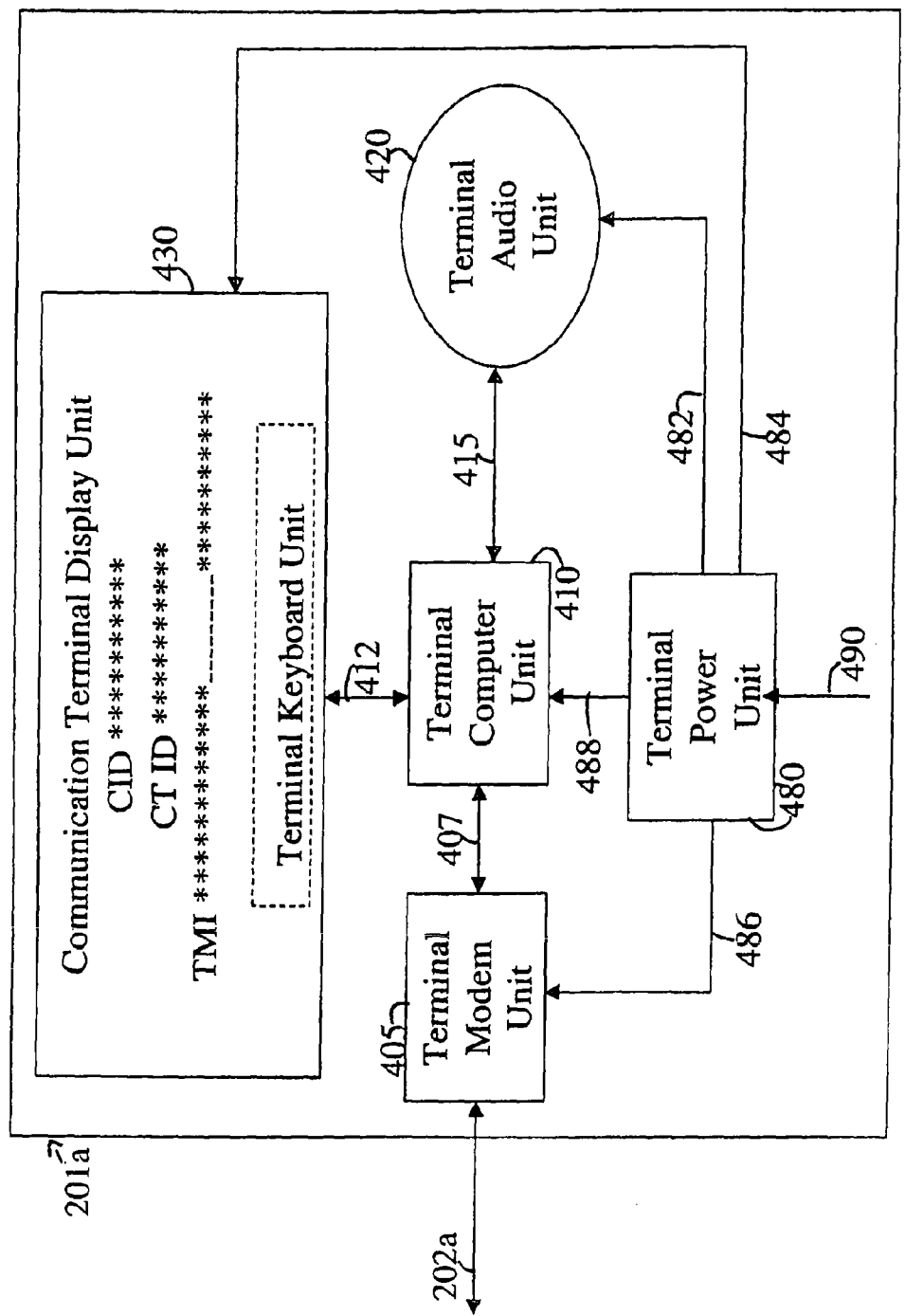
Figure 4 Advanced Communication Terminal Elements

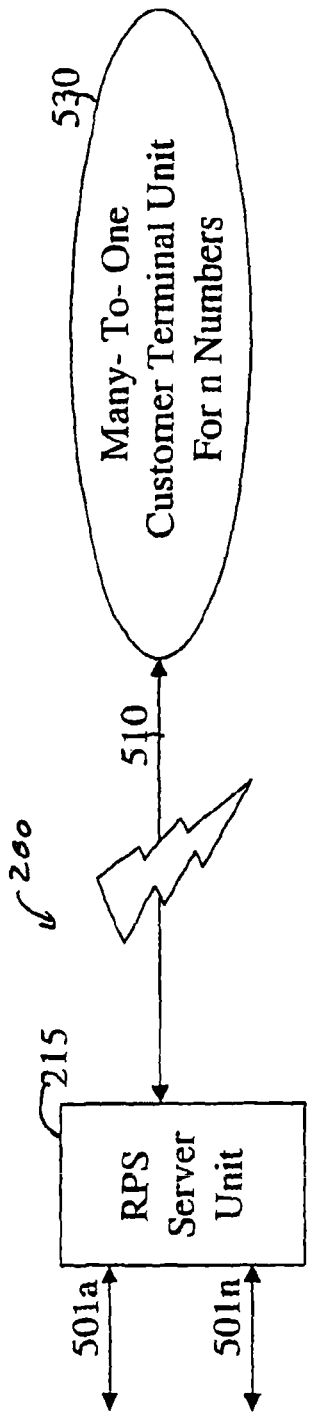
Figure 5 RPS Multiple Number Customer Using A Many-To One Customer Terminal Unit
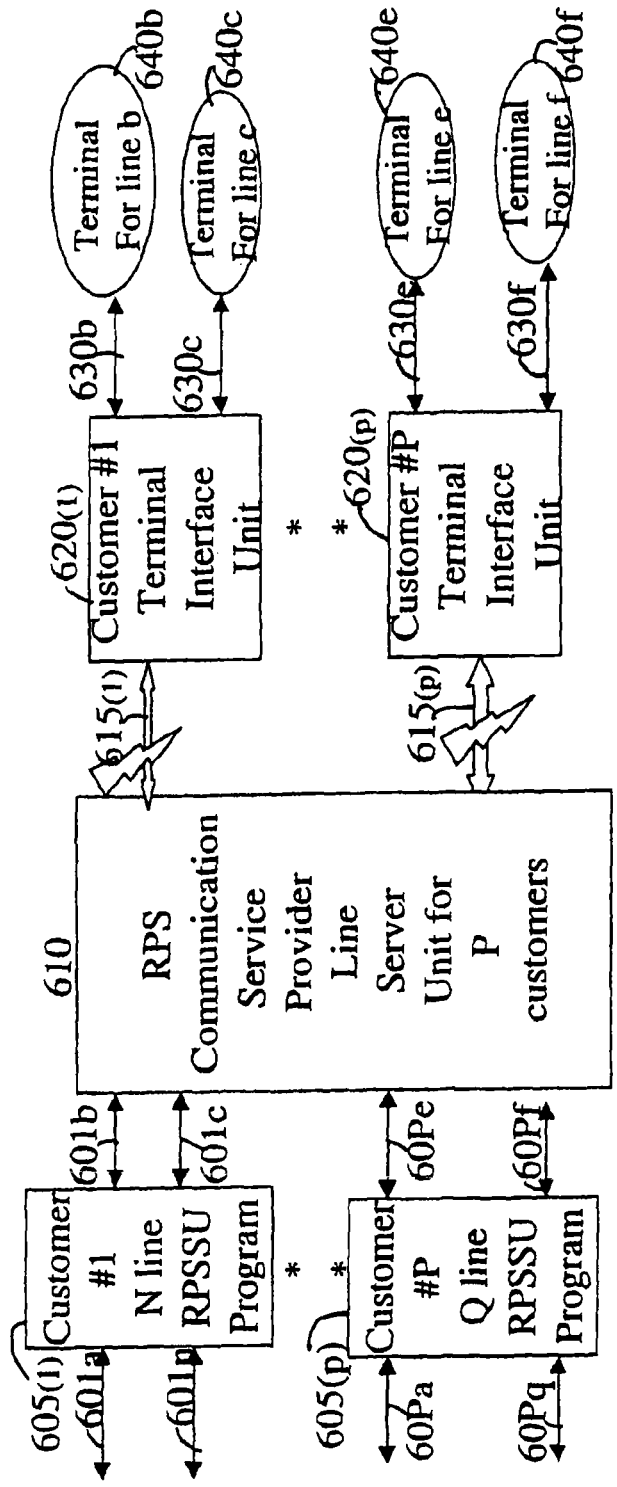
Figure 6 Multiple RPS Customers Having Multiple Line Local Terminal Interface Units

REMOTE PBX SYSTEM AND ADVANCE COMMUNICATION TERMINALS

CROSS REFERENCE TO RELATED APPLICATIONS

This application is a continuation of U.S. Ser. No. 11/787,070, filed Apr. 13, 2007 which is a continuation of U.S. Ser. No. 10/341,901, filed Jan. 13, 2003, which claims the benefit of U.S. Ser. No. 60/350,444, filed on Jan. 11, 2002; and to the provisional patent application U.S. Ser. No. 60/366,020, filed on Mar. 19, 2002, all of which are hereby incorporated herein by reference in their entirely.

STATEMENT REGARDING FEDERALLY SPONSORED RESEARCH AND DEVELOPMENT

BACKGROUND OF THE INVENTION

1. Field of the Invention

The systems and devices relate to telecommunications, computers and communication terminal devices and central digital switches. In particular, it relates to local PBX and computer systems and to those related terminals associated with both PBX systems and to communication service provider services including, but not limited to call forwarding, call waiting, caller identification, voice box, short message service, and conferencing services. The field of art additionally relates to communication terminals such as digital phones, PDA's, two-way pagers, computers, and Network Service Provider Services and methods.

2. Prior Art

There have been many new remote services added to telecommunication systems in the last fifteen years; the more notable automated services being caller ID (CID), call waiting, call waiting caller ID, call forwarding, remote access call forwarding, three-way calling, last call redial, call blocking, and voice box capability. In addition, multiple-line phones (e.g. two-line, four-line, etc.) are available to replace the more sophisticated LPS systems (as defined below) for small businesses, as well as the home. In the last ten years, LPS have become a commodity because of the digital computer revolution, but the LPS still require multiple-line installation at the user's facilities.

Telecommunication switch technology has advanced so that "soft switches" are digital control points where "switch" call features can be added or subtracted by the communication service provider using software programs. However, the multiple lines associated with the legacy PBX still require multiple lines to be pulled to the customer location (either separate lines or a multiple-line trunk, such as a T1 line) where an LPS must be installed to distribute the lines to various local terminals.

In the case of mobile phones, such services as roaming, and the ability to have several numbers associated with the same mobile phone, are also available with limited success. One approach taken by the wireless industry is to give a user several phone numbers that can ring on the same phone. The Nokia 3360 model device, for example, has this capability for three lines. Theoretically, the Nokia 3360 model can answer three phone numbers associated with the phones Electronic Serial Number (ESN) if the service provider assigns the customer three numbers. However, the customer must set the phone to one of the three numbers they want to use, which defeats the whole purpose of having three active lines. Also, actual experience with this approach has not been successful because the numbers are tied to the terminal ESN and cloning detection software programs have made the phones inoperable in many cases. Thus, in the past, the ability to have several numbers ring one or several phones and let the customer know which phone number has been called, was only available with the LPS system designs (unless the customer lets the lines roll over at the CSP and, even this feature would not be available).

With the growing mobile society, the need for multiple phone numbers ringing at several customer terminals at different physical locations simultaneously so that the customer knows which terminal was called, is a growing need. In accordance with the present invention, a single RPS computer could provide LPS services to 10,000 multiple-line customers rather than 10,000 customers each being required to buy their own LPS system.

FIG. 1 depicts the element architecture for prior art LPS systems where multiple-line incoming or outgoing connections are directed from an LPS computer located at or near the customer's various phones or terminal units. In FIG. 1, a customer with n phones 130a to 130n can be connected by the customer's LPS computer 115 via lines 120n to 120n to calls by n callers 101a to 101n via lines 102a to 102n connected to the party's respective CSP 105. The customers LPS system 115 is connected to the customer CSP (also at 105) via lines 110 when calls are established. The newer LPS systems allow customers to direct their terminals to other terminals in the LPS when they are at other locations without notifying the LPS master operator. Also, several phone services have been developed to aid the mobile worker such as "Emma the Perfect Secretary" offered by Preferred Voice Inc. at www.preferredvoice.com to overcome the many limitations of an LPS. "Emma the Perfect Secretary", for example, will let the LPS forward incoming calls to the last number provided by an LPS terminal user. However, this service will not automatically tell the user who is calling or tell them which line is being called.

Also, the prior art communication terminals have made many advances in the last five years and most all have displays to show the user who is calling and other stored information. However, these terminals have not been modified to detect and display inbound PBX information about the line being called, for example. They also have not been modified to send outgoing PBX information to the CSP such as telling a CSP which line to use when making an outgoing call.

Problems to be Solved: One problem to be solved is that of allowing a person to have several lines allocated to service several business or personal needs and letting the owner direct the incoming traffic to the terminal the owner specifies in a manner that lets the owner know which of the various lines is being called (as well as the calling party) prior to answering the terminal. A related problem is that of allowing a user to have a single terminal that the user can direct to handle numerous lines (e.g. their cell phone) in a manner that allows the user to know which line is being called and whom is calling each line and vice versa (calling out on one of several possible line numbers from a single line terminal).

Another related problem is having a system that allows a CSP to give out many numbers to a family or business without supporting the additional numbers with additional data delivery capability. A related problem to solve is that of providing a simple method for individuals to originate conference calls to many participants without using an expensive conference scheduling service with much higher long distance rates than the individual normally pays. Yet another related problem is allowing a company or family to have an intercommunication system that works like an LPS intercom even though the company or family does not have an LPS. Another problem to be solved is to eliminate the "double" service provider cost the customer is currently paying for the communication services required to access the Internet using ISP portals such as AOL or MSN. Most all of the services offered by the various portals such as AOL, MSN, Yahoo, Amazon, e-Bay, and many others, have become ubiquitous and can be offered directly by the customer's CSP to eliminate the double expenses currently being charged for terminal connections. A related problem associated with the communication terminals (phones, PDA, computers, two pagers, etc.) connecting a customer to the CSP networks, are that these devices need to be advanced to give them the capability to send and receive multiple "on-hook" commands and messages similar to those used with wireless terminals. Once this capability exists, the advanced services described herein can be provided by the CSP at little additional cost. In other words CSP terminals of all types need to be advanced to easily provide more CSP services that utilize the 100-fold digital computer advances incorporated into the CSP computer systems over the last ten years and which are now becoming available worldwide.

Summary Of Invention: A remote PBX and computer system for providing selectable communication and computer services to multiple customers, the selectable communication and computer services provided are similar to communication and computer services provided by a local PBX and computer systems for a single customer. The system is comprised of a plurality of terminal units for each customer and each customer terminal unit is capable of connecting to the remote PBX and computer system using at least one of the customer communication service providers.

The system has a remote PBX server unit adapted to provide or cause to be provided for each customer, the communication and computer services provided by legacy PBX system, legacy remote soft switch services and client server computer systems. The remote portion of the system has a customer interface unit that allows each customer to select the communication and computer services to be provided after the customer provides valid security and payment information. The remote portion has a customer processor unit that is adapted to control the communication for each customer terminal unit and is adapted to provide or cause to be provided the communication and computer services selected by each customer each time the service is requested. The remote system has a billing program for each of the customers. The system uses two communication means for interfacing with the remote PBX server unit for each customer and for permitting communication between each customer and the customer interface unit so each customer can select the desired communication or computer services and for permitting communication between each customer terminal unit and the customer processing unit so the customer terminal unit provides to the customer the same communication and computer information for each selected communication or computer service that would be provided by a local PBX and computer system using a similar customer terminal unit when providing the same service to a single customer.

One communication means uses an Interactive Voice Response (IVR) system located at the remote PBX server unit so existing customer terminals can be used with the system and the other communication means uses Advanced Communication Terminals (ACT) that are existing mobile phones, PDA's and computers adapted to automatically communicate PBX and computer service signals between the customer and the remote system to provide faster and more efficient service.

In one preferred embodiment, the remote-shared system is operated as part of the customer's communication service provider system and the system allows different and separate communication or computer services to be selected by separate customers but the services are provided or caused to be provided by the same remote system.

In another embodiment, the remote system also provides the individual communication soft switch services such as Caller ID, Call Waiting and Call Forwarding for each of the customer lines controlled by each customer processing unit.

In another embodiment, the remote system also provides the customer all their required Internet services, along with their PBX and client server computer services. In yet another embodiment, the remote portion of the shared system also provide the customer all their required personal computer services from the remote location such as described in the "Split Personal Computer System" discussed in U.S. Pat. No. 6,243,743.

In a preferred embodiment, the remote PBX service allows multiple-customer terminal numbers to be assigned to a single- or multiple-customer terminal at various physical locations and automatically manages the customer terminals for the customer in a manner that allows the customer to know which line has been called prior to answering the terminal. In this embodiment, the customer can decide to answer the called line at another location based on the Caller ID or other considerations, such as letting the phone be answered by those at the location where the line is connected.

The customer can remotely modify where the line numbers are directed to ring and appear in a manner similar to that now used to accomplish call forwarding. Existing phones or other terminal units used with the RPS require only a display and a simple Called Terminal ID (CTID) detection and transmission program to be implemented to convert the unit into an Advanced Communication Terminal (ACT) device. Once the terminals are modified to detect and display the CTID, the existing call forwarding service can be expanded to provide this additional service without having to provide a full RPS service. Billing can be done on a per-use or flat monthly service charge depending on the type of phone service provided by the RPS. In addition the RPS will allow various lines to be selected by the customer for making outgoing calls so that recipients having CID will detect the proper phone number as established by the customer in their various businesses or assigned to a family member.

By way of example, a customer that has the RPS service can dial a number such as *82 (or go to the RPS service provider's website) that then allows the customer to input a phone number from a list of approved predetermined numbers belonging to the customer, such as the customer's office, home and/or mobile numbers, to ring on the terminal being used to dial *82 (or the terminal specified at the RPS service provider's website) and the RPS will send the specified CTID when the number is called to the customer terminal specified. The directed CTID will be displayed on the terminal specified by the customer, along with the caller ID, and will also ring at the terminal with the CTID (ringing at both locations is optional). To remove the CTID service from ringing on any selected terminal, the can user dial, for example, *92 (or go to a website of the RPS service provider) to remove or change where the CTID is supposed to be directed. In this manner, persons can always know who is calling home or the office and not have to keep checking voice mail boxes for important messages, yet still let unimportant messages go into the person's regular mailbox or RPS mailbox. The system also allows customers having multiple lines at the remote PBX to select which line outgoing calls are made so the called party gets a CID selected by the customer rather than the CID of the terminal the customer is using. Also, the RPS service allows a much more flexible conferencing system to be offered the consumer now only available from expensive conference call services. Moreover, the system allows a company to sell multiple-terminal numbers to families or businesses without having to run additional lines to the customer facilities. The RPS system also allows a single large bandwidth line (e.g. DSL) to service multiple lines in parallel for homes similar to the way current service is provided to businesses when the ACT devices that detect special CTID numbers sent by the RPS are used. The RPS allows conference calls to be originated by the customer using regular phones with an IVR at the RPS. Such conference calls can be set up much faster by using an ACT device compatible with the RPS. The RPS services described will greatly enhance the customer service provider revenue and only increase the communication operating system cost a small amount because of the economy of scale afforded by a single server system sharing PBX service with thousand of customers. This replaces the cost of thousands of customers each buying their own local PBX and computer system.

For example, if a service provider such as Sprint or AT&T wireless service offered the RPS service and only added a single number to each of their customers for half the price of the original number without actually providing the line or link, they could generate an additional $400 million dollars each month with virtually no additional cost.

BRIEF DESCRIPTION OF THE SEVERAL VIEWS OF THE DRAWINGS

FIG. 1 is a block diagram of prior art Local PBX System elements.

FIG. 2 is a block diagram of the Communication Service Providers (CSP) and Remote PBX System (RPS) elements.

FIG. 3 is a block diagram of the Remote PBX server unit individual customer elements.

FIG. 4 is a block diagram of an Advanced Communication Terminal elements.

FIG. 5 is a block diagram of an RPS Multiple Number Customer using a many-to-one Customer Terminal Unit.

FIG. 6 is a block diagram of a Multiple RPS customer having multiple line local Terminal Interface Units.

DETAILED DESCRIPTION OF THE INVENTION

1. Definitions

A "Local Private Branch Exchange System" is abbreviated throughout as "LPS". The LPS is often referred to simply as a "PBX" in industry and business communities and the major elements of an LPS are shown in FIG. 1. However, since this invention "splits" the "PBX" tasks between a customer local system and a remote computer system, it is important to define the local "PBX" prior art system and services more precisely as an LPS for purposes of clarity. LPS are privately owned (or leased) computer and terminal units and connect to multiple communication lines provided normally by public communication service providers. The LPS is located, for example, at a company office or buildings owned by the company or institution such as a school or government agency. Small LPSs are also available for two- to ten-line service at homes and small businesses. The LPS directs both the incoming connections from the communication service provider and the outgoing connections to the communication service provider for connections to remote locations and services. A main feature of the LPS is that it's local computer can connect a single line to many local terminals and this gives the owner a "one-line-to-many terminals" capability not currently available from the service provider without special arrangements. The number of LPS terminals to purchase is decided by the LPS owner and the terminals are connected to one or more LPS local computers and located at the owner's discretion. The LPS service provided to each LPS terminal by the LPS computer also are specified by the LPS owner. The services available depend on the particular LPS purchased by the LPS owner and these legacy services are well known in the art and are not the subject of this invention. The communication lines (or links) connecting the LPS facilities to the communication service provider facilities are normally brought by the communication service provider. These lines (or links) are often referred to as "the last mile connections" and normally, there is a separate charge for making or changing these connections. The lines (or links) connect to the LPS computer, either as a group of single narrow band lines, or as one or more wide bandwidth lines such as a single T1 line (or link) that, for example, will carry many narrow band lines. More recently, point-to-point microwave links, fiber optics and cable are being used to deliver multiple narrow band lines (or links) to many LPS systems. Office buildings providing LPS services to their tenants from a central location are also good examples of an LPS. Note tenants in other office buildings must also have an LPS and cannot share the same LPS computer, lines or terminal units, a fact that stresses the limitations of an LPS. A number of companies manufacture or sell the LPS equipment such as Nippon Electric Company, Panasonic, Sony, AT&T, Lucent, Nortel, and many others. Currently, an LPS computer that can handle 48 lines with 24 LPS terminal units costs between $10,000 and $20,000 depending upon the features purchased. Normally, the computer and terminal elements of the LPS are not interchangeable between manufactures or between models, and upgrades occur every several years similar to the company computer upgrade requirements.

In summary, the LPS provide a "one-line-to-many terminals" capability with limited communication services to a private customer and requires special customer terminal units.

A "Remote Private Branch Exchange System" is abbreviated as "RPS" throughout and allows many LPS services plus new services to be provided, for example, by a communication service provider to multiple individuals or companies. The RPS "splits" the LPS hardware and software and linking tasks so the "PBX" computer portion is done by the communication service provider for many customers and eliminates the need for each LPS customer to purchase and install an LPS computer system at their home or office and in many cases to even have multiple lines brought to the customer's facility. An RPS only requires the customer to have a communication terminal unit, such a fixed phone or computer terminal or a mobile phone or computer terminal, at the point of service. In essence, the RPS is a "many-lines-to-one terminal" system combined with the legacy "soft switch" features available with each line, plus many prior art LPS services. More important, the RPS will work with almost any existing type communication terminal unit. Equally important, the LPS computer hardware and software upgrades, plus day-to-day maintenance that are currently the responsibility of the LPS owner, becomes the responsibility of the communication service provider offering the RPS service. Since the RPS service provider can service thousands of customers with only one RPS computer system to maintain, the RPS design provides a much more economical system than thousands of customers each having to maintain their own LPS. The RPS solves the many limitation problems and cost problems associated with the LPS. In addition, the RPS opens up opportunities for the CSP to provide new low-cost computer and network services to individuals, small, medium and even some larger companies and institutions. For that reason, it will be assumed throughout that the RPS provides shared PBX and computer services normally provided by non-shared LPS and computer system owned by companies and individuals.

In summary, the RPS provides many LPS and "soft switch" communication services to multiple customers and can use many different types of customer terminal units, including a regular phone.

A communication "Terminal Unit" abbreviated "TU" refers to communication terminals of all types that will connect to a communication service provider system. A "Customer Terminal Unit" abbreviated "CTU" and "Party Terminal Unit" abbreviated "PTU" are often used to distinguish between a calling party TU and the customer TU or vice versa for purposes of clarity. A phone TU, computer TU, or other TU that can connect to a communication service provider system are referred to as "phone" or "terminal" sometimes interchangeably.

A "Communication Service Provider" is abbreviated as "CSP" throughout and the CSP owns or operates the communication systems that connect a CTU to a PTU, for example. When connecting parties use a different CSP system, a "Communication Carrier Network" abbreviated as "CCN" throughout, is used to connect the parties' different CSP systems. Notable examples of CSP and CCN companies are Verizon, Quest, AT&T, Sprint, SBC, BT, Cingular, XO, WorldCom and many other smaller companies only offering CSP.

An "RPS Server Unit" or "remote PBX apparatus" is abbreviated as "RPSSU" throughout and refers to the computer system used to provide the RPS services to multiple customers and would normally be co-located with the "soft switch" computers owned by the CSP.

A "soft switch" computer controls the individual line communication services a customer uses such as Caller Identification, Call Forwarding, Voice Box and is generally referred to herein as "legacy communication remote services". These remote services were already available at the "switch or line" level prior to this invention and offered by most CSP already, as opposed to RPS communication services which normally require control of more than one customer line to provide both LPS and legacy communication remote soft switch services from a communication service provider location, although there are some services the RPS can give a single-line customer.

The legacy CSP service, for example, "Caller Identification" information is abbreviated as "CID" throughout and refers to information that identifies the calling party or the calling party number being used.

The RPS service "Called Terminal Identification" information is abbreviated as "CTID" throughout and the information identifies the CTU number dialed by the calling PTU. The CTID information is sent from the RPSSU to the CTU in a manner, for example, similar to how CID is sent now using header information sent with the ring signal.

"Outbound Caller Identification" information is abbreviated as "OCID" throughout and the information is sent from a CTU and tells the RPSSU which customer line to make the call appear to be originating from. The OCID allows the RPS to provide the same service, for example, that an LPS system currently provides customers. That is, if the called party has "CID", for example, the called party receives the CID selected by the customer using either their own LPS or using an RPS service provider that can detect an OCID sent from the CTU. Note: OCID is required by the RPS provider in order to provide this important LPS service to each of their RPS customers.

"Terminal Message Information" is abbreviated throughout as "TMI" and denotes message information such as those provided telemarketers on LPS systems when certain lines ring or certain CIDs are detected, or both are detected for example, and a predetermined message is automatically sent to a terminal prior to the terminal operator answering the phone.

"Conference Call Terminal Origination" is abbreviated as "CCTO" and is an RPS service that allows the RPS customer to originate conference calls to a large number of parties and the RPSSU automatically calls and connects all the parties and the originator pays the Long Distance (LD) charges for all parties. Again, the CCTO is needed to provide conferencing services currently available on many LPSs.

"Conference Call Terminal Inbound" is abbreviated "CCTI" and is an RPS service that allows conference calls to be scheduled in such a way that the parties must call a special number good for only a short time period (such as 10 minutes) and they will be connected to the conference call if their CID matches one on a predetermined list. The calling party pays the LD charges in the CCTI method. The CCTI is an example of the advantages provided with an RPS service versus owning an LPS. The CCTI is an RPS conference service not currently available or possible with LPS equipment.

There are many other such RPS services not available with an LPS. For example, services now provided by other Network Service Providers (NSP) such as Internet Service Providers (ISP) and Application Service Providers (ASP) are also included in the range of RSP services available to customers using the RPSSU described herein.

An "Advanced Communication Terminal" is abbreviated as "ACT" throughout and refers to any TU devices that have been modified to allow automatic detection or generation of RPS information such as CTID and sent by a CSP or RPSSU as a service from a remote location to multiple RSP customers.

An "Interactive Voice Response" system is abbreviated throughout as an "IVR" that can be used to communicate the various RPS services between a CTU and the RPSSU or CSP. The currently available IVR systems used with many LPS systems can be used on the RPS computer so that ACT devices are not required to obtain RPS services.

A "line", or "customer's telephone communication link" refers to a communication system for permitting communication between a TU and a CSP. Currently available examples of a "line" or a "customer's telephone communication link" are a telephone line, a T1 line, a wireless telephone communication link, and combinations thereof.

The term "telephone number" as used herein refers to the ordinary meaning of the term wherein the telephone number is a numeric code used to identify a TU. The term "telephone number" also refers to alphanumeric codes, such as e-mail addresses or domain names, as described in U.S. Pat. No. 6,477,242, the entire content of which is hereby incorporated herein by reference.

The term "user communication" as used herein refers to audio and/or video information.

2. Detailed Description

Referring now to the drawings, shown in FIG. 2 is an RPS 20c constructed in accordance with the present invention. The RPS 200 is described with the aid of FIGS. 2 through 6 and can operate using an Interactive Voice Response system (IVR) so existing customer terminals can be used to interface with the remote portions of the system. With the aid of FIG. 4, a description of communication terminal modifications that allows customer terminals to be used with an RPS service without using an Interactive Voice Response system (IVR) is also described. The general embodiment of the RPS element is described with the aid of FIG. 2 that shows a general communication network (CCN) 270 connecting all the various Communication Service Provider (CSP) 205 and connecting all the Internet Service Providers (ISP) terminals 250 to all communication terminal units 201 via 202, 206 and 240, respectively. For later describing the RPS operation, FIG. 2 also shows just a single calling party terminal unit (PTU) 201*b* connected via 202*b* to their CSP 205*a* and then to the CCN 270 via 206*b* and then connected via line 206*c* to the CSP 205*b* of a single RPS customer having lines 202*a* through 202*c* being controlled by an RPS 200 RPSSU 215 and connected to the customer terminal units (CTU) 201*a* and 201*c*, respectively.

In general, FIG. 2 shows that all communication terminal unit 201 elements of every type are connected to all the CSP 205 elements via 202 on the "line side" (sometimes thought of as the customer side) where the CSP 205 element switch in turn connects the terminal unit element 201 to another terminal unit element (also shown as 201) that is either connected to the same CSP 205 element via line 202 or the CSP 205 element connects the customer terminal 201 element via line 202 to the CCN 270 element via 206 on the "trunk side" (sometimes referred to as the carrier side) of the CSP 205 switching unit element. The CCN 270 element in turn connects the calling party terminal 201 element via line 202 to a different CSP 205 element connected to the CCN 270 and serving the called party terminal 201 element. These different CSP 205 elements in turn connects the customer terminal 201 element to other party terminal 201 elements or connects the customer terminal 201 element to the customers ISP terminal 250 element via 240. Throughout the description, a customer or user or party terminal element 201 refers to a terminal unit or device such as a phone, computer, wireless device, PDA, tablet computer, laptop computer, set top box, or Internet appliance used by individuals and companies that will connect via 202 with a CSP 205 element that the individual or company uses to provide their terminal unit 201 element communication services. A CSP 205 element is normally the user's phone company such as SBC, Quest, Sprint, AT&T, BT, NEC, Verizon, XO, etc., but can be an Entertainment Service Provider (ESP) or a Wireless Service Provider (WSP) (not shown) such as Comcast, Time Warner, Cingular or AT&T Wireless, for example, although a separate network company such as AOL or MSN could buy lines and offer the RPS services described herein to multiple customers. Throughout the description the term CSP refers to any company that provides connections (switches) and services for terminal units and includes the ESP and WSP companies, for example. The line side terminal unit 201 element can connect to the CSP 205 element via 202 using cable, satellite, land lines, wireless, fixed wireless and broadcast links and the CSP 205 element in turn connects to other CSP 205 elements and ISP 250 elements via trunk lines 206 using portions of the CCN 270 elements composed of the same type of communication links listed for the terminal side link 202 and 240. It is interesting to note that all ISP terminal 250 elements also need to use a CSP 205 element, (connection 240) just like all individual terminal unit 201 elements need to use a CSP 205 element (connections 202) in order to provide Internet services such as e-mail, stock quotes, news and other services to the customer terminal 201 elements. This is clearly a double CSP cost to the customers in terms of additional infrastructure and bandwidth cost to receive ISP services, a fact to be discussed in more detail later, but a fact that economically supports the offering of computer services as well as PBX services from the same shared remote computer system.

To describe the RPS operation in more detail, a specific CSP 205*b* is shown in FIG. 2 serving a specific customer having several terminals located in various locations such as CTU 201*a* and CTU 201*c*. We will assume at least one of the customer terminals (such as CTU 201*a*) has been modified to detect and display at least two-call control signals, to be described in more detail in connection with FIG. 4, and at least some of the CTU can detect Caller ID (CID) information and Called Terminal ID (CTID) information with or without the aid of an IVR system, to be described in more detail later. The CTU 201*a* and 201*c* are connected to the customer's RPSSU 215 located at the customer's CSP 205*b* facility providing the RPS service to the CTU 201*a* and 201*c* via lines 202*a* and 202*c*, respectively. All the call control signals between the CTU 201*a* and 201*c* and the customer's RPSSU 215 are sent on lines 202*a* and 202*c*, respectively. The customer's RPSSU 215 might, for example, be operated at the remote XO Inc. CSP facilities; or the Progressive Concepts WSP facilities in Dallas, Tex., that services customer lines 202*a* and 202*c* connected to the RPSSU 215 serving the customer CTU 201*a* and 201*c*. The RPSSU 215 control signals will be discussed in more detail in connection with describing the elements of the RPSSU 215 with the aid of FIG. 3. Note that the customer may have several CSP 205*b* such as one for wireless terminals and one for the land or cable lines providing service to the customer's various terminals such as 201*a* and 201*c* at various locations. Normally, the customer only needs one CSP 205*b* offering the RPS services and that CSP 205*b* will manage all the other CSP 205 switch controls the customer might use, for example, or the customer can have several RPS services with several CSP 205 companies serving different sets of lines. The RPSSU 215, to be described in more detail in connection with FIG. 3, interfaces and controls multiple-terminal line-side switches for each of their RPS customers such as for 202*a* and 202*c* located or controlled at the 205*b* CSP facility. The individual switch programs process calls to or from the CTU 201*a* and CTU 201*c* lines 202*a* and 202*c*, respectively, for example, where as the RPSSU 215 program handles multiple-line features to be described in more detail later. You might say the RPSSU 215 program manages the multiple individual line or switch programs for each customer. For example, the party PTU 201*b* calling the CTU 201*c* serviced by CSP 205*b*, as shown in FIG. 2, is being served by a separate CSP 205*a* and can be used to describe how the RPS works when two different CSP 205 are involved. When the CTU 201*c* is called from the party PTU 201*b*, for example, the caller PTU 201*b* is first connected by the caller's CSP 205*a* switch via line side 202*b* to the CCN 270 via a trunk line 206*b*. The CCN 270 carry all the "carrier" lines between the separate CSP 205 locations and use all forms of local and long distance communication transport means, protocols and carriers, including satellite, wireless, copper, cable, fiber optic and broadcast systems, including the dedicated Internet networks and routers that might use POTS, VPN, ATM, ISDN, CDMA, TCP/IP type communication protocols, for example.

Digital communication switching systems used by the CSP 205 companies are old in the art (see prior art references U.S. Pat. Nos. 5,625,681 and 5,448,631) and are not described in detail but suffice it to say they are programmable switches called a soft switch in the art. They are used at the local and carrier exchanges to control connections based on the "soft switch" features available to the customer and sold by companies such as Nortel, Lucent, Cisco, etc. The individual lines (lines and switches are used interchangeably) are controlled by "soft switch programs" but groups of customer lines are controlled by an RPS program located at the CSP 205b. For example, all the CSP 205 such as CSP 205a and CSP 205b used in this example could connect to the CCN 270 via line 206 using 13 digit terminal numbers of which the first three digits represent country codes, the next three digits represent area codes, the next three digits represent branch codes and the last four digits represent branch terminal numbers and they could connect to ISP terminals such as 250 using the Universal Resource Location (URL) Internet protocol. Continuing the call routing RPS example between PTU 201b and CTU 201c, the PTU 201b CSP 205a sends the connection request made at PTU 201b over the CCN 270 via 206b to the customer's RPSSU 215 located at the customer's CSP 205b via line 206c. Note: both the calling party's CSP 205a and the called customer's CSP 205b are connected to the CCN 270 and each of the CSP 205a and CSP 205b might currently offer various legacy "soft switch" service features to their customers. Features such as caller ID, call waiting, 3-way calling, call blocking, short message services, and Internet connections are some of the legacy "soft switch" services currently available with the individual switch programs located at some of the CSP 205 facilities. The RPS services described herein represent new "multiple switch" management program features involving multiple switch groups that can be bundled with the legacy features for a complete RPS service or provided separately as new customer service features. Before the RPS invention, the line 206c from the CCN 270 would connect only at the legacy switch 205b and the legacy switch 205b would make the connection and provide any CSP 205b legacy soft switch services ordered by the customer for CTU 201c and send these services over line 202c along with the ring signal, for example.

With the RPS invention, a customer's CSP 205b switch connects line 206c directly to the customer's RPSSU 215 to complete the request for a connection between the caller PTU 201b and the CTU 201c. To describe an RPS feature, we will first assume the customer had previously directed the RPSSU 215 to send ring signals sent to CTU 201c to both CTU 201a and CTU 201c. We will describe how this is done in more detail in connection with FIG. 3. The RPSSU 215 would then send the CTID number actually dialed by the caller PTU 201b, along with the PTU 201b CID, to terminal 201a to be displayed with the ring signal and also send the CID of PTU 201b along with a ring signal to CTU 201c in the normal manner.

Note the RPSSU 215 sends the CID of PTU 201b to both the CTU 201a and 201c but only sends the CTID of the CTU 201c to CTU 201a since it is the customer terminal, not dialed by the caller from PTU 201b, but it is a terminal the customer wants CTU 201c calls to also be directed by the RPSSU 215. In this manner, when a customer terminal only displays the CID, the user knows the terminal ringing is the one dialed by the calling party. Note that the terminals can be made to ring at both CTU 201a and 201c or to only ring at CTU 201a in the old style call forward type of operation depending on the service selected by the customer and programmed at the RPSSU 215. Also the RPSSU 215 can be directed to let users at both phones 201a and 201c pick up the phone in a true conference call-type operation even though they may be miles from each other.

In other words, RPS customers can have a complete company intercommunication system just like the legacy LPS systems, as described in FIG. 1, provided to employees but without the location restrictions of the LPS.

The phone 201a, described in more detail in connection with FIG. 4, has the ability to detect both the caller 201b CID and the CTID number of CTU 201c and present to the customer at CTU 201a prior to the customer causing the CTU 201a to be connected to PTU 201b. In cases where CTU 201a or 201c or both would require long distance (LD) charges being paid for by the caller 201b, the RPSSU 215 could be made to charge the PTU 201b those charges associated with the actual CTU 201c being called and, if additional charges were incurred because of the RPSSU 215 connecting to other terminals, these additional LD charges would be billed to the customer's RPSSU 215 account, along with describing what lines were being charged on which calls.

To call out from one of the CTU 201a or 201c, the user can select both the PTU number to be called and the line 202a or 202c they want the call to be made on, just like an LPS system allows. The RPSSU 215 then dials the PTU number using the customer line selected by the user and sent to the RPSSU 215 from either CTU 201a or 201c. If a line 202a or 202c for making the call is not selected at the CTU 201 when originating the outbound call, the RPSSU 215 uses the number of the CTU (or a number selected as a default number) originating the call. In this manner, the customer can control the CID number received by the called party terminal, a very important feature for individuals with several businesses.

In a similar manner, the RPSSU 215 can be programmed to allow an RPSSU 215 customer to originate conference calls using an IVR system to provide the RPSSU 215 the numbers to call or by the RPSSU 215 detecting a command sent from a customer terminal 201a, for example, that indicates a list of conference call terminal numbers will follow. The numbers sent after either an IVR system or the command was completed will then be automatically dialed by the RPSSU 215 in sequence and connected to the CTU 201a as a conference call.

For example, if the customer wanted to dial PTU 201b and CTU 201c from location CTU 201a, as well as three other party numbers represented by PTU 201d thru 201f (not shown), connected to their respective owners CSP 205, upon transmitting these numbers to the RPSSU 215 either by an IVR system located at the RPSSU 215 or using the CSP 205a website, or using an Advanced Communication Terminal (ACT) to be described in more detail in connection with FIG. 4, the five terminal numbers are dialed and connected as a conference call when answered by the called parties. In cases where more parties are called than the customer has lines, the RPSSU 215 borrows lines from the CSP 205b on a temporary basis just like the conference call service companies borrow lines. Such a conference call system would spur many additional conference calls for which the RPSSU 215 service provider can charge for each call and for temporary lines increasing both the CSP and the LD revenue.

The conference call system, as described, is referred to as a "Conference Call Terminal Originate" (CCTO) RPS service. The CCTO system, as described, requires the customer to pay for all the LD charges but a "Conference Call Terminal Inbound" (CCTI), where the conference parties were required to pay their own LD, is available with the RPS 200. The CCTI uses a special time-sensitive, temporary number provided by the RPSSU 215 to the RPS customer that, in turn, they supply to all the conference parties hours, days or weeks in advance. In the CCTI system, the RPSSU 215 would accept calls on a special line number borrowed temporally from the CSP 205b, for example, and not assigned to any customer during a predetermined time period given by the customer.

During that time period, calls to the special line would be sent to the customer terminal (or through an IVR system), along with the calling party CID for approval before connection to the conference call. In the CCTI system, each of the calling parties pay their long distance charges unless special arrangements are made. Again, the CCTO and CCTI conferencing systems are easy to use and allow the RPSSU 215 to provide a needed service to replace the legacy 3-way conferencing system available to individuals and small businesses that only allows a conference call among three parties. Also, the CCTO and CCTI eliminate the shortcoming of the LPS where the number of conferencing parties is limited to the number of lines coming into the LPS plus the lines are tied up during the conference call. With the RPSSU 215, an unlimited number of participants are available even to customers with only a single line and, for multiple-line customers, the other lines do not have to be utilized, the call can be made with all temporary lines provided at a small fee by the RPS service provider.

The services described above, along with a number of other RPS services, are shown in Table 1 and, in most cases, the services can be provided by the RPSSU 215 using either ACT devices or an IVR system with legacy phones. Some services shown are currently only available to some wireless service providers; however, the RPS 200 can provide these services to non-wireless customers. The suggested ACT device commands and the service features along with the customer benefits are listed for each service.

TABLE 1

RPS Features And Customer Service Benefits

| RPS Features | Feature Description | Customer Service Benefits |
|---|---|---|
| 1 SETUP | Lets customer open account & change selected features | Easy for customer to open account add lines change service options and package; also customer can pay from the terminal |
| 2 TRAN | Customer selects where various lines should be directed using RPS menu | Easy for customer to direct where the calls will ring and select if call rings at several location or just operates like legacy call forward |
| 3 MIPC | Connects customer to their Mi-pc RPS computer | Lets RPS service providers to offer the same service as ISP but customer does not need an Internet connection all the communication from Mi-pc to Internet is made by RPS |
| 4 CTID | Called Terminal ID Sent To terminal while "on hook" | Lets a customer with multiple lines know which line the party is calling prior to being connected |
| 5 CID & CTID | Both Caller ID & CTLID sent to terminal while "on hook" | Lets a customer with multiple lines know which line the party is and who is calling prior to being connected |
| 6 OCID | Sends outbound calls on customer specified line | Lets multiple line customers tell the RPS which line to dial out on so their called party sees a CID of the customers choosing |
| 7 CCTO | RPS receives a string of party numbers from the customer's terminal after CCTO signal | Lets a customer with just one line set up conference calls to an unlimited number of participants and the RPS automatically dials the numbers and the LD rates are his LD carrier rates |
| 8 CCTI | RPS receives calls during a predetermined time period set by the customer to a number set by the customer the RPS sends each CID to the custom for connection approval | This feature is a little more complicated than CCTO but lets all the calling conference parties pay their own LD charges or for just those the customer wants to pay - both CCTI and CCTO can be used for the same conference call so LD charges can be split according to customer choice |
| 9 ICS* | Connects customer lines to customer lines Independent of customer terminal location | This service provides business and families conference calls or intercom service even though there might be some LD charges when some of the terminals are out of the local exchange or CSP |
| 10 ISP* | Connects customer terminal to URL sent after ISP signal | This services lets the RPS connect to an Internet URL without the customer needing a separate ISP account |
| 11 SISP | RPS connects to URL sent after SISP command | Provides Secure safe connections to the Internet and does not reveal customer terminal or computer information to website |
| 12 MWN* | Sends "message waiting at CID #" notice with party terminal "on hook" | Lets a customer send or receive "please call me" messages without having to call a terminal message box. Will work with IVR Or ACT devices - ACT devices are clearly much more convenient - this service can be used to provide IM without ISP account |
| 13 TMI | sends predetermined text associated with CTID and CID to customer ACT device | Allows companies to let their employees work From home or mobile terminals and program the RPS to do the work currently done by Company Local PBX systems |
| 14 TMIS | Lets the customer send short messages to parties that have ACT devices and the ACT receives them still "on hook" | This service provides the service now being provided by two way messaging systems with the added feature the receiving party can get a complete message or complicated computer file by taking the ACT device "off hook". Also, this provides E-mail between parties where at least one party does not have an E-mail Account - considering there are 3 billion phones and only 300 million computers, 9 people use phones for each E-mail user |

TABLE 1-continued

RPS Features And Customer Service Benefits

| RPS Features | Feature Description | Customer Service Benefits |
|---|---|---|
| 15 PCT* | Connects the customer terminal to the party terminal following the PCT signal | Provides automatic connection service for both common Internet sites (e.g. e-bay, AOL, CNN etc) and common companies or services such as local weather with PSTN numbers customers can use this service using IVR or ACT devices |
| 16 SEM* | The RPS sends information attached to E-mail address sent after the SEM signal | This is an E-mail service provided by the RPS for out going E-mail. The customer does not have to have an E-mail account |
| 17 REM* | The RPS establishes E-mail account using a customer specified line number E-mails put in box & MWN sent out | Establishes an E-mail account using customer line numbers and allows SEM to have a return address connected to the sender. Also allows customers to use E-mail without having a separate ISP account - With a computer as the ACT device works just like E-mail with an ISP or Local company E-mail system |
| 18 LIST | RPS will send the requested customer list to the customer ACT device | Allows customers to maintain all their customer and personal address and schedules at the RPS facility and access from any ACT device at any time - keeps all ACT devices slaved to master |
| 19 STOCK | RPS sends information regarding Stock Symbol sent after STOCK signal displays while "on Hook" | Provides the customer with instant access to stock and other financial info such as bank balance with terminal "On Hook". Requires the customer to provide accounts and passwords so the RPS server can accomplish automatically. |
| 20 IVRS | Lets the customer use the RPS Interactive Voice Response (IVR) system for many of the RPS services without having to have and ACT device | Services that can be used easily with the IVRS and existing phones or computers are (1) SETUP (2) TRAN (3) MIPC* (4) CTID (5) CTID & CID (6) OCID (7) CCTO (8) CCTI (9) ICS (10) ISP and (11) SISP (12) MWN. The other services normally require new ACT devices or computer devices with RPS provided software - *not always |

*These are legacy services provided by CSP to be combined with the new RPS services.

The RPSSU 215 is described in more detail with the aid of FIG. 3. The RPSSU 215 has a Customer Interface Unit (CIU) 320 that allows the customer to directly control the RPS services via line 330. The RPSSU 215 can be called directly by the customer and follow instructions provided by an Interactive Voice Response (IVR) program that requires the customer to input their security information such as a "username" with their "password", for example. IVR systems such as those available with the IBM Websphere 2.0 server system and software have more than adequate capability to automatically interact with the customer using either voice commands or touch tone commands. The CIU 320 can also be connected to a customer CSP 205b website, for example, via 330 where the customer can go to the website, enter their password, select services and re-direct lines using the menu provided by the website program. The CIU 320 also maintains the usage log for each customer and sends the billing information to the RPSSU 215 billing computer program via line 230 or to a CSP 205b customer account program, for example. The CIU 320 tasks can be handled by the RPSSU 215 server such as a Lucent EXS® Converged Service Platform or Nortel Passport 6400 Express Manager system as part of the digital switching computer used by the RPS service provider or a separate computer such as an IBM 900Z series computer or an hp 9000 Superdome Enterprise server capable of handling thousands of customer programs, as described in more detail in connection with FIG. 6. The individual CIU 320 settings last selected by the customer are sent to the Customer Processing Unit (CPU) 305 via line 325. The CPU 305 RPS program makes the proper settings in the control switch programs for each customer line based on the last settings sent to the CIU 320 by the customer. The programs for services such as listed in Table 1 are stored in the CPU 305 database allocated for each customer and the services requested by the customer are either done by the CPU 305 or caused to be done by the customer's CPU 305. For example, if the customer wants line 202c to be sent to several terminals other than 201a the CPU 305 as described earlier, the CPU 305 program would set those parameters into the appropriate switch control program associated with each of the lines specified by the customer. These line switch control programs are well known to those skilled in the art of telecommunication system computers such as the Lucent EXS® Converged Service Platform or Nortel Passport 6400 Express Manager system. Similar programs control the wireless phone switching hubs that already have the ability to send control signals upon command to any of the wireless phones within their hub cell and those methods are also well known in the art of wireless communication switches. Also, if the customer specifies to the CIU 320 that the terminal can be answered at several locations, the proper bridge set up is made by a CPU 305 conference program, for example, so that conference calls or "interoffice" communication is possible for the customer's employees located at different physical locations. When the customer does not want to take the call, the call can be sent to the customer's voice box 340a or 340c via line 342a or 342c, respectively, depending upon the settings made by the customer in the CIU 320 and relayed to the voice box program stored in the 305 database for each customer.

In order for the RPS service to provide the customer with the proper information and control, the customer's terminals must be capable of presenting information and control options to the customer while the CTU is still "on-hook" or, at least the caller thinks the phone is "on-hook". Since the RPSSU 215 is directly between the "trunk" side (between the LPS and CCN 270 via line 206c) and "line" side (between the CTU and the RPSSU 215 via lines 201a and 201c) of the customer terminal connections, this "on-hook" customer communication can be done in two basic ways. One way requires no modification to existing customer terminals such as phones, computers and PDA's and uses an IVR-type system such as those available with the IBM Websphere 2.0 system that is currently a popular LPS middle ware interface between the LPS terminals and the calling or called parties. The other way would be to expand the number of "on hook" commands like those that currently send CID messages and notice of voice box messages automatically to terminals such as the Nokia 3360 wireless terminal. The RPSSU 215 design that uses an IVR system not requiring changes to existing terminals would take much longer because of the human voice or touch tone response time. In the case where no terminal changes are required an IVR program would be part of the CPU 305 database for each customer. The CPU 305 using such an IVR program would maintain a ring signal at the caller terminal while communicating with the customer terminal with the IVR system. When the customer answers the phone 201a, for example, the IVR system would notify the customer that "a call was coming in on line 202c from terminal 201b CID" and tell the customer "to say the number '1' or touch '1' on the keypad if they want to take the call", for example. For outbound calls, the IVR system would, for example, ask the customer "on which line the call should be placed" and tell the customer how to enter the line number so the recipient terminal would receive the CID desired by the customer.

In FIG. 4, the basic elements required in a preferred embodiment for a digital ACT is shown which eliminates the need for an IVR system in the CPU 305 as described above. In FIG. 4, an ACT device such as 201a connects the line 202a from the RPSSU 215 to a modem unit 405 that includes the interface with the service provider communication media such as an RF transceiver and an antenna for a wireless unit or an Rill or RJ45 connector for hardwired terminal units. The modem unit 405 decodes incoming and encodes outgoing signals sent via line 407 from an ACT computer unit 410 that connects to the user ACT audio unit 420 and an ACT display unit and an ACT keyboard unit 430 via lines 415 and 412 respectively. Power is supplied by a power unit 480 to each of the units 405, 410, 420 and 430 via lines 486, 488, 482, and 484, respectively, which can be connected to an external power source via line 490. Devices meeting the requirements in FIG. 4, except they are not currently programmed to detect and display both CID and CTID messages for example, are the Nokia 3360, the Sony SCP-6000 and the Motorola T193 wireless phones or the Sony S9226 land line terminals. Computer terminals such as the Dell 8100 notebook and PDA's such as the Palm model VII or Handspring Treo model 270, all have the hardware elements necessary for an ACT as shown in FIG. 4. When, for example, the customer signs up for service, an appropriate program stored at the RPSSU 215 for each of the predetermined devices can be downloaded to the customer's terminal allowing it to become an ACT device able to automatically communicate with a customer's RPSSU 215 service unit. Programming any of the current digital terminals, such as those mentioned above, to detect another message such as the CTID in addition to the CID at the factory, is an easy task for those skilled in the art.

In addition to being able to share a single large RPS 200 system with thousands of customers, another big advantage of putting the RPS 200 at the CSP 205 rather than the customer buy their own LPS, is the ability for the CSP and especially WSP to provide their customers with multiple phone numbers without having to build additional bandwidth delivery capacity.

In FIG. 5, the elements of such the RPS 200 are shown where a customer has a single CTU 530 serviced by the RPSSU 215 handling phone numbers 501a to 501n on the trunk side of the system. However, the customer only has one number 510 connecting the CTU 530 on the line side of the RPSSU 215 and only one of the customer lines a to n, called by a caller or called out by the customer is active at any one time except possibly during conference calls. Thus, a customer with a single CTU such as 530 can have an unlimited number of numbers for carrying on many businesses (or for family members) while only having one line run to their home or various business locations. Such a system is a "many-to-one" connection service where only one line is connected at a time. Such systems are not possible with the LPS because all the lines on the "trunk side" must be available at the owner's LPS computer. This problem is eliminated with the RPS "split PBX design" because the RPS computer is located at the CSP facility where all the "trunk lines" are located. The customer only needs a single line if the customer never needs more than one phone, such as a mobile phone, but the customer can have many numbers. This is a good service for the CSP 205 because giving out phone numbers on the trunk side costs little but the CSP 205 can charge a lot for providing the customer more line numbers even when they do not provide more line side carrying capacity.

In FIG. 6, the elements of the RPS 200 are shown that will serve many customers at a home or office and provide each a full featured LPS with only a single or many terminals from a remote location. Eliminating the need to have any LPS software located locally to provide all the LPS services gives an economy of scale advantage to the CSP 205. In FIG. 6, P customers are represented by RPSSU 605(1) to RPSSU 605(*p*) that can all use the same server system such as an IBM z900 series or hp 9000 Superdome Enterprise server for storing and managing each RPS customers multiple switch control RPS program. A great economic advantage is gained because the cost of serving 10,000 customers from a single RPS computer versus 10,000 customers each buying their own LPS is quite apparent. The economy of scale can give a 1000 to 1 cost advantage to the CSP companies over the LPS equipment companies offering the same services. In fact, the RPS service cost becomes so low almost every individual could have multiple-line numbers with only a single mobile terminal as described in connection with FIG. 5 and always know which line is being called or designate which line a call is to be made. In addition, companies and families that do need or want multiple lines and multiple terminals can either use separate narrow bandwidth lines, as described in connection with FIG. 2, or a single large bandwidth line, represented by 615(1) to 615(p) in FIG. 6. The large bandwidth line can be a DSL, cable or even a T1 line connecting a line server unit located at the RPS facility 610 that can share P customers and a Terminal Interface Unit (TIU) at each of the P the customers' facilities 620(1) to 620(p). The LPS and other network service features are provided by the individual RPSSU 605(1) to 605(p) for each of the P customers without having to install an LPS system as shown in FIG. 1 at each customer facility. For example, Customer 1 can have n lines represented by 601a and 601n and Customer P can have q lines represented by 60Pa to 60Pq. Customer 1 RPSSU 605(1) connects active lines 601b and 601c to the shared-line server unit 610 while Customer P RPSSU 605(p) connects active lines 60Pe and 60Pf to the same shared-line server unit 610. The line server unit 610 connects Customer 1 active lines 601c and 601c to Customer 1 local TIU 620(1) via line 615(1) and, at the same time, connects Customer P active lines 60Pe and 60Pf to Customer P local TIU 620(p) via line 615(p). Customer 1 TIU 620(1) connects the active lines 601b and 601c to the terminal for line b, 640b, and the terminal for line c, 640c, via local lines 630b and 630c respectively. Similarly, Customer P TIU 620(p) connects active lines 60Pe and 60Pf to the terminal for line e, 640e, and the terminal for line f, 640f, via local lines 630e and 630f, respectively. Such a system allows companies or families to move and not have the expense of installing new LPS. The local TIU 620 can be incorporated into the multi-channel wireless units operating with the 900 mhz phones such as the Sony S9226. The wireless connections allow terminals that can be moved easily by the customer. Families can have several lines serviced by a simple DSL line with all the features of a home LPS including intercom features. Also the economy of scale provided by such a design is enormous since the basic RPS software program (not shown) located at the CSP facility of the RPS service provider can be shared just like the line server unit 610. Such an RPS can service many customers with the individual customer's features (P customers used in FIG. 6) maintained separately in their individual customer's RPSSU 605(1) to RPSSU 605(p) that can share a large multiplex/de-multiplex unit 610 that can handle many trunk lines 615(1) to 615(p) serving many individual customer local multiplex/de-multiplex units 620(1) to 620(p) as shown in FIG. 6. For example, small modifications to the elements in the home wireless network equipment connecting multiple computers such as the Linksys Inc. etherfast cable modem model #BEFCMU10 connected to a Linksys Inc. Router model #BEFW11S4 Ver 2 connecting to the type elements incorporated into individual Linksys Inc. wireless adapter units model #WUSB11 Ver 2.6 would provide up to 50 ACT terminals for a home or small business.

Similar modifications would allow current LPS systems to offer many of the features of the RPS system by incorporating the ACT devices, such as an individual's cell phone, with the ability to detect CTID and originate conference calls, for example. Such a system would provide a much more flexible and inexpensive LPS design than currently available.

Such economy of scale allows all of the sophisticated LPS service now only affordable by large companies to be made available to small businesses and individual families. Plus, many medium and large businesses may want to get out of the phone management business because the RPS can offer features not possible with the LPS at much lower prices due to the economy of scale described above. Because of this economy of scale and not having to run lines every time a customer wants more numbers, or temporary numbers, clearly gives the RPS a sizeable economic advantage over the LPS.

Changes may be made in the construction and the operation of the various components, elements and assemblies described herein and changes may be made in the steps or the sequence of steps of the methods described herein without departing from the spirit and scope of the invention as defined in the following claims.

What is claimed is:

1. A method for providing a remote PBX service by a customer's phone service provider, comprising the steps of:
   receiving control signals by a customer interface unit, the control signals indicative of an assignment of more than one telephone number for one customer's telephone communication link, the one customer's telephone communication link in communication with one or more customer terminal units;
   receiving a connection request from a calling party terminal unit by a customer processing unit, the connection request including one of the telephone numbers assigned to the one customer's telephone communication link and a caller identification identifying the calling party terminal;
   generating a called telephone code indicative of the one of the telephone numbers included in the connection request by the customer processing unit; and
   sending the called telephone code and the caller identification to at least one of the one or more customer terminal units via the customer's telephone communication link whereby a user of the customer's telephone communication link is capable of knowing which of the more than one telephone numbers assigned to the one customer's telephone communication link was called prior to answering a customer terminal unit, the customer's phone service provider providing the remote PBX service for the customer without the necessity of a local PBX.

2. The method of claim 1, wherein the customer terminal unit is a wireless telephone.

3. The system of claim 1, further comprising the step of selecting, by each customer, local PBX services to be provided from the customer's phone service provider.

4. The system of claim 3, wherein the step of selecting is defined further as selecting, by each customer, a local PBX service to be provided from the customer's phone service provider only after the customer provides valid security and payment information.

5. The system of claim 1, further comprising the step of providing, by the customer's phone service provider, separate local PBX services to separate customers.

6. In a system having a customer's phone service provider, the improvement comprising:
   a remote PBX apparatus having local PBX functionality therein for a plurality of customers without the necessity of having local PBXs for each such customer, the remote PBX apparatus generating a called telephone code indicative of a telephone number included in a connection request by a customer processing unit and sending the called telephone code and a caller identification to at least one of one or more customer terminal units.

7. The system of claim 6, wherein the remote PBX apparatus is associated with the customer's phone service provider.

8. The system of claim 6, wherein a plurality of customer terminal units is associated with each customer.

9. The system of claim 6, wherein the remote PBX apparatus includes a customer interface unit that allows each customer to select communication and computer services to be provided.

10. The system of claim 9, wherein the customer interface unit allows the customer to select communication and computer services only after the customer provides valid security and payment information.

11. The system of claim 6, wherein the customer processor unit is configured to control the communication for each customer terminal unit and is configured to cause to be provided the communication and computer services selected by each customer each time the service is requested.

12. The system of claim 6, wherein the remote PBX apparatus provides separate local PBX services to separate customers.

\* \* \* \* \*

UNITED STATES PATENT AND TRADEMARK OFFICE
CERTIFICATE OF CORRECTION

| | | |
|---|---|---|
| PATENT NO. | : 8,958,540 B2 | Page 1 of 1 |
| APPLICATION NO. | : 13/735808 | |
| DATED | : February 17, 2015 | |
| INVENTOR(S) | : Charles C. Freeny, Jr. | |

It is certified that error appears in the above-identified patent and that said Letters Patent is hereby corrected as shown below:

In the Specification:
Column 17, line 39: Delete "Ri11" and replace with -- RJ11 --

Signed and Sealed this
Fourth Day of August, 2015

Michelle K. Lee
*Director of the United States Patent and Trademark Office*